(12) United States Patent
Preller (10) Patent No.: US 6,587,361 B2
(45) Date of Patent: Jul. 1, 2003

(54) SWITCHED-MODE POWER SUPPLY WITH LOW SWITCHING LOSSES

(75) Inventor: Peter Preller, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/099,188

(22) Filed: Mar. 15, 2002

(65) Prior Publication Data

US 2002/0131283 A1 Sep. 19, 2002

(30) Foreign Application Priority Data

Mar. 15, 2001 (DE) .......................................... 101 12 537

(51) Int. Cl.[7] .............................................. H02M 7/539
(52) U.S. Cl. ...................................... 363/97; 363/21.01
(58) Field of Search ........................... 363/21.01, 21.05, 363/21.13, 97, 131

(56) References Cited

U.S. PATENT DOCUMENTS 5,285,368 A * 2/1994 Ishikawa ..................... 363/21
5,325,282 A * 6/1994 Bansard ..................... 363/97
5,748,460 A * 5/1998 Ishikawa ..................... 363/21
5,852,550 A * 12/1998 Majid et al. ................. 363/21

FOREIGN PATENT DOCUMENTS

DE 197 32 169 * 4/1999 ............ H02M/3/28

* cited by examiner

Primary Examiner—Jeffrey Sterrett
(74) Attorney, Agent, or Firm—Laurence A. Greenberg; Werner H. Stemer; Gregory L. Mayback (57) ABSTRACT

A method for driving a switch in a switched-mode power supply, in which the switch is connected in series with a primary coil of a transformer and in which a control signal dependent on an output voltage is available. In this case, reference instants at which a voltage present across the switch corresponds to a first reference voltage value or at which a voltage present across the primary coil corresponds to a second reference voltage value are detected and counted, the switch being closed again only after the number of detected reference instants has reached a comparison numerical value. The invention furthermore relates to a switched-mode power supply for realizing the method according to the invention.

12 Claims, 6 Drawing Sheets

SWITCHED-MODE POWER SUPPLY WITH LOW SWITCHING LOSSES

BACKGROUND OF THE INVENTION

Field of the Invention

The present invention relates to a method for driving a switch in a switched-mode power supply, in particular in a free-running switched-mode power supply, and to a switched-mode power supply.

Switched-mode power supplies serve for providing an at least approximately constant, load-independent output voltage for a connected load. To that end, a primary coil of a transformer is connected in series with a switch to a supply voltage, and a secondary coil that is inductively coupled to the primary coil is connected, usually via a rectifier configuration, to the load for providing the output voltage. The primary coil takes up energy when the switch is closed and outputs the energy to the secondary side when the switch is subsequently opened. The switch is driven according to drive pulses generated by a drive circuit. The energy which is taken up by the primary coil per switch-on period of the switch and subsequently output to the secondary coil for supplying the load is larger, the longer the switch remains closed. The power consumed by the switched-mode power supply corresponds to the time average of this energy taken up per switch-on period of the switch.

The switch-on periods of the switch are prolonged with rising power consumption of the load, in order that the voltage present across the load can be kept at least approximately constant. In order to set the duration of the drive pulses, a control signal dependent on the output voltage is formed. If the output voltage changes on account of a load change, then the control signal also changes in order, in this way, to be able to adapt the duration of the drive pulses to the changed load conditions.

In order to define the switch-on instants of the switch, it is known to evaluate the voltage present across the primary coil or the switch and to close the switch again after opening when the primary coil is free of energy or demagnetized, that is to say when the primary coil has output its stored energy to the secondary side. In the case of small loads with a low power consumption, when the drive pulses are very short and the energy taken up by the primary coil per switch-on operation is correspondingly low, this results in a high switching frequency.

The switching losses of the power supply unit increase with a rising switching frequency of the switch. Therefore, Published, Non-Prosecuted German Patent Application DE 197 32 169 A1 proposes a switched-mode power supply in which, in the case of a small power output of the switched-mode power supply, the switch is not immediately switched on when the primary coil is free of energy or demagnetized. Rather, in the known switched-mode power supply, the switch-on instants are also set in a manner dependent on the control voltage, the time duration between two switch-on instants being longer, the smaller the power output by the switched-mode power supply. In order to set the switch-on instants, in the known apparatus, the control signal is used to form a pulse-width-modulated signal whose duration depends on the amplitude of the control signal and which concomitantly determines the time interval between two drive pulses.

SUMMARY OF THE INVENTION

It is accordingly an object of the invention to provide a method for driving a switch in a switched-mode power supply and a switched-mode power supply that overcome the above-mentioned disadvantages of the prior art methods and devices of this general type, in which a rise in the circuit losses in the case of a low power output is avoided.

With the foregoing and other objects in view there is provided, in accordance with the invention, a method for driving a switched-mode power supply having a power switch connected in series with a primary coil of a transformer. The switched-mode power supply generates a control signal dependent on an output voltage of the switched-mode power supply. The method includes the step of detecting reference instants. The reference instants are first reference instants at which a power switch voltage present across the power switch corresponds to a first reference voltage value or second reference instants at which a coil voltage present across the primary coil corresponds to a second reference voltage value. The power switch is closed after the number of the reference instants detected has reached a comparison numerical value. The comparison numerical value is increased or decreased in dependence on whether the control signal exceeds an upper limit value or falls below a lower limit value.

The method according to the invention for driving the power switch in the switched-mode power supply, which is connected in series with the primary coil of the transformer, provides, after the opening of the switch, for reference instants at which a voltage present across the switch corresponds to a first reference voltage value or at which a voltage present across the switch corresponds to a second reference voltage value to be detected and for the switch to be closed only when the number of detected reference instants corresponds to a comparison numerical value. The comparison numerical value is increased or reduced depending on whether a control signal dependent on an output voltage exceeds an upper limit value or falls below a lower limit value.

The method according to the invention utilizes so-called free transformer oscillations, which are established if, after the demagnetization of the primary coil, the switch is not immediately closed again in order to supply the primary coil with energy again. The free transformer oscillations result from a resonant circuit that, in the case of free-running switched-mode power supplies, is formed by the primary coil and a snubber capacitor connected in parallel with the switch, or in series with the primary coil. The transformer oscillations bring about a periodic alternating voltage across the switch or the primary coil. In the method according to the invention, "zero crossings" of the periodic voltage present across the primary coil or across the switch are detected. In the text below, "zero crossing" designates an instant at which the amplitudes of the periodic alternating voltages across the switch, or across the primary coil, in each case intersect the amplitude value about which they periodically oscillate, or which corresponds to the average value of the respective periodic alternating voltage. The primary coil is at least approximately free of energy during the zero crossings. The interval between the zero crossings is constant and depends on the frequency of the resonant circuit.

The method according to the invention utilizes the uniformly spaced zero crossings as a temporal reference for switching on the switch again. The number of zero crossings that occur before the switch is switched on again is dependent on the comparison numerical value that is set in a manner dependent on the control signal. In this way, the switch-on frequency can be reduced as the output power decreases.

The comparison numerical value is increased or reduced depending on whether the control signal exceeds an upper limit value or falls below a lower limit value. In one embodiment, in which the control signal increases with a decreasing output voltage, the comparison numerical value is reduced if the control signal exceeds the upper limit value. The reduction of the comparison numerical value leads to an increase in the switching frequency or to a shortening of the time duration until the next switch-on of the switch and thus counteracts a further decrease in the output voltage. If the control signal drops below the lower limit value, then the comparison numerical value is increased in order to reduce the switching frequency and thus counteract a further rise in the output voltage.

The control signal is preferably evaluated before the counting up of the comparison numerical value during an evaluation time duration that is longer than the period duration of a periodically changing load, the comparison numerical value being counted up only when the control signal remains below the lower limit value during the entire evaluation time duration. Periodically changing loads lead to a periodically fluctuating output voltage and a periodically fluctuating control signal. The evaluation of the control signal during an evaluation time duration which is longer than the period duration of the load changes, and increasing the comparison numerical value only when the control signal remains below the lower limit value during the entire evaluation time duration, prevents the comparison numerical value from being counted up when the control signal just drops momentarily. As a result, it is possible to prevent the comparison numerical value from jumping back and forth between two successive numerical values and to avoid a continually changing switch-on frequency. It is important to prevent a continually changing switch-on frequency in order to avoid disturbances in a connected load, for example disturbances in the picture geometry of a television set, or humming in the transformer.

The minimum value of the comparison numerical value is one, which is equivalent to the switch being switched on again directly after the demagnetization of the primary coil.

In accordance with one embodiment of the invention, only those zero crossings are detected at which the voltage across the switch decreases or at which the voltage across the primary coil rises. In the case of such zero crossings, the storage capacitor undergoes a discharge process, that is to say the energy stored in the capacitor decreases. The switch-on of the switch with the storage capacitor being discharged reduces the switching losses since the storage capacitor is completely discharged anyway when the switch is closed.

A switched-mode power supply according to the invention has a switch which is connected in series with a primary coil of a transformer and turns on or turns off according to drive pulses, a drive circuit for generating the drive pulses in a manner dependent on an enable signal, and a controller configuration at which a control signal dependent on an output voltage is available. In order to generate the enable signal, a circuit configuration is provided which has a detection circuit, which detects reference instants at which a voltage present across the switch corresponds to a first reference voltage value or a voltage present across the primary coil corresponds to a second reference voltage value. A first counter is connected to the detection circuit, the counter has an output at which a first counter signal is available. The circuit configuration for generating the enable signal furthermore has a second counter having a first input, at which a signal is present which is dependent on a comparison of the control signal with a lower limit value, and a second input, at which a signal is present which is dependent on a comparison of the control signal with an upper limit value. The second counter also has an output at which a comparison counter signal is available. The first counter signal and the comparison counter signal are fed to a first comparator configuration, which provides the enable signal in a manner dependent on a comparison of the first counter signal with the comparison counter signal.

In accordance with one embodiment of the invention, a further comparator configuration is provided, which provides a first comparison signal, which is dependent on a comparison of the control signal with the lower limit value, and a second comparison signal, which is dependent on a comparison of the control signal with the upper limit value.

In accordance with an added feature of the invention, the drive circuit receives the control signal and the enable signal. The drive circuit outputs the drive pulses in a manner dependent on the enable signal and the control signal.

In accordance with an additional feature of the invention, the switch-on instants of the drive pulses are dependent on the enable signal and the drive pulses have a duration dependent on the control signal.

In accordance with a concomitant feature of the invention, the circuit configuration has a flip-flop connected between the further comparator configuration and the second counter. The flip-flop has a first input, a second input, and an output. The first input receives a signal dependent on the first comparison signal and the second input receives a clock signal. The first signal fed to the first input of the second counter is dependent on an output signal of the flip-flop.

Other features which are considered as characteristic for the invention are set forth in the appended claims.

Although the invention is illustrated and described herein as embodied in a method for driving a switch in a switched-mode power supply and a switched-mode power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In the figures, unless specified otherwise, identical reference symbols designate identical parts and signals with the same meaning. Referring now to the figures of the drawing in detail and first, particularly, to FIG. 1 thereof, there is shown an exemplary embodiment of a free-running switched-mode power supply which is suitable for carrying out the method according to the invention.

Figure 1:
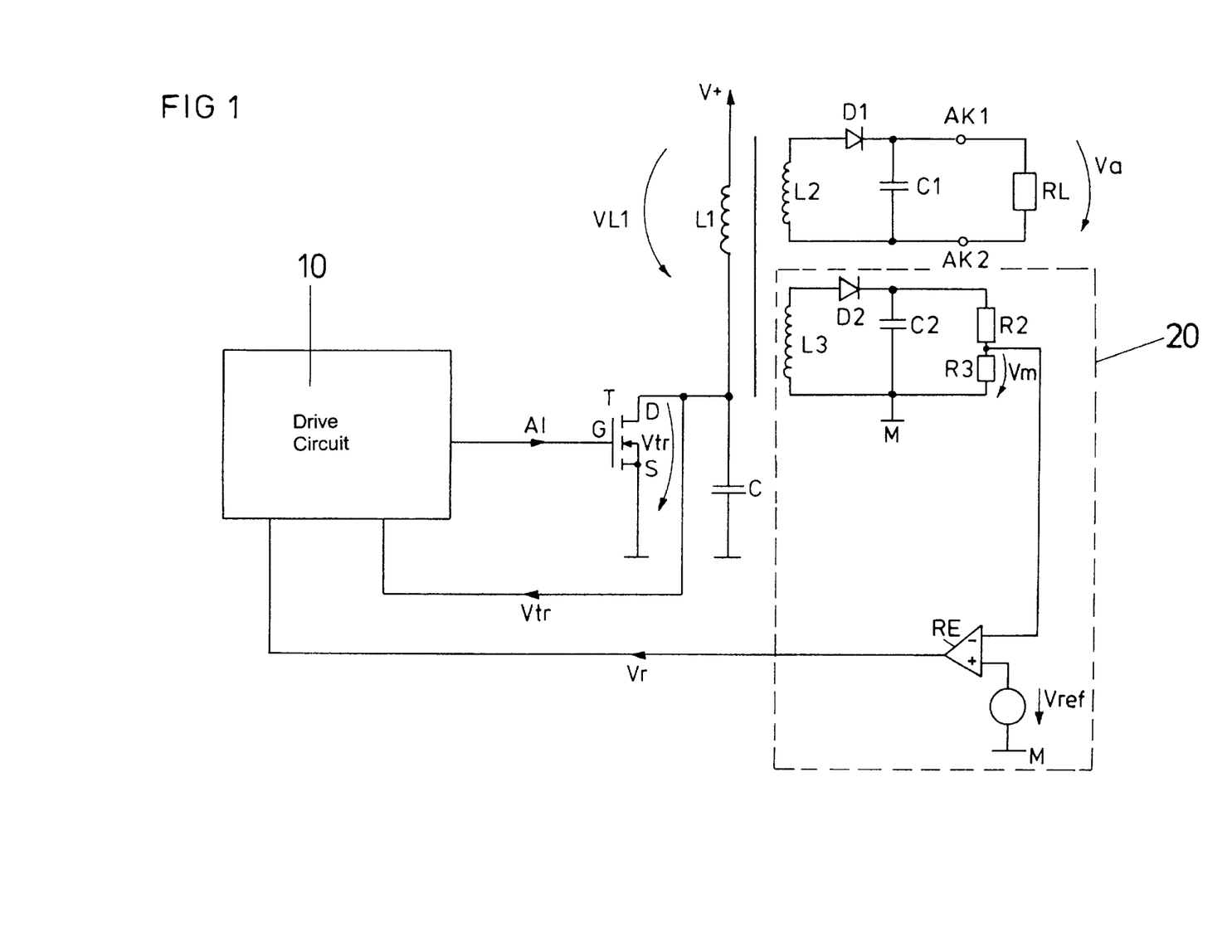
FIG. 1 is a block diagram of an embodiment of a switched-mode power supply with a switch connected in series with a primary coil according to the invention.

The switched-mode power supply has a switch T, which is a metal oxide semiconductor field-effect transistor (MOSFET) and is connected in series with a primary coil L1 of a transformer. The series circuit contains the primary coil L1 and the switch T being connected to a supply voltage V+ between a terminal for supply potential and a terminal for reference-ground potential M. A snubber capacitor C is connected in series with the primary coil L1 and in parallel with a drain-source path D-S of the transistor T. A drive circuit 10 is provided for driving the transistor T, which drive circuit 10 is connected to a gate terminal G of the transistor T and provides drive pulses AI according to which the transistor T turns on or turns off.

The transformer has a secondary coil L2, which is inductively coupled to the primary coil L1 and downstream of which is connected a rectifier configuration for providing an output voltage Va at output terminals AK1, AK2. In the exemplary embodiment, the rectifier configuration contains a series circuit containing a diode D1 and a capacitor C1, it being possible to tap off the output voltage Va across the capacitor C1.

The switched-mode power supply serves for providing an at least approximately constant output voltage Va to a load $R_L$, which is illustrated by way of example as a nonreactive resistor RL in FIG. 1. When the transistor T is in the on state, the primary winding L1 takes up energy via the supply voltage V+, and, when the transistor T is subsequently in the off state, outputs the energy to the load RL via the secondary winding L2 and the rectifier configuration D1, C1. The power output to the load RL, and thus the output voltage Va, is dependent on a switch-on frequency with which the switch T is switched on, and on a time duration for which the transistor T remains in the on state in each case after the switch-on. These two quantities, namely the switch-on frequency and the duration of the drive pulses, are set by the drive circuit 10 in a manner dependent on a control signal Vr, which is dependent on the output voltage Va, and in a manner dependent on a voltage Vtr present across the switch or a voltage VL1 present across the primary coil L1. In the exemplary embodiment in accordance with FIG. 1, the voltage Vtr across the transistor T is used as a manipulated variable.

In order to provide the control signal Vr which is dependent on the output voltage, a control configuration 20 is provided, which uses an auxiliary coil L3 inductively coupled to the primary coil L1, a rectifier configuration connected downstream of the auxiliary coil L3 and has a diode D2 and a capacitor C2 and a voltage divider R2, R3 connected in parallel with the capacitor C2 to provide a voltage Vm proportional to the output voltage Va. A controller RE compares the voltage Vm with a reference voltage Vref and provides the control signal Vr at an output. The controller RE is, in particular, a proportional controller, a proportional-integral controller or integral controller. The controller RE illustrated in the exemplary embodiment in accordance with FIG. 1 has a proportional control response and is an operational amplifier having a very large gain. For the control signal Vr, in the example it holds true that the control signal Vr decreases if the output voltage Va increases, and that the control signal Vr increases if the output voltage Va decreases.

It is an aim of the method according to the invention for driving the switch T to reduce the switch-on frequency, i.e. the frequency with which drive pulses for turning on the transistor are generated, in the case of small output powers. The basic steps of the method are explained below with reference to FIG. 2.

Figure 2:
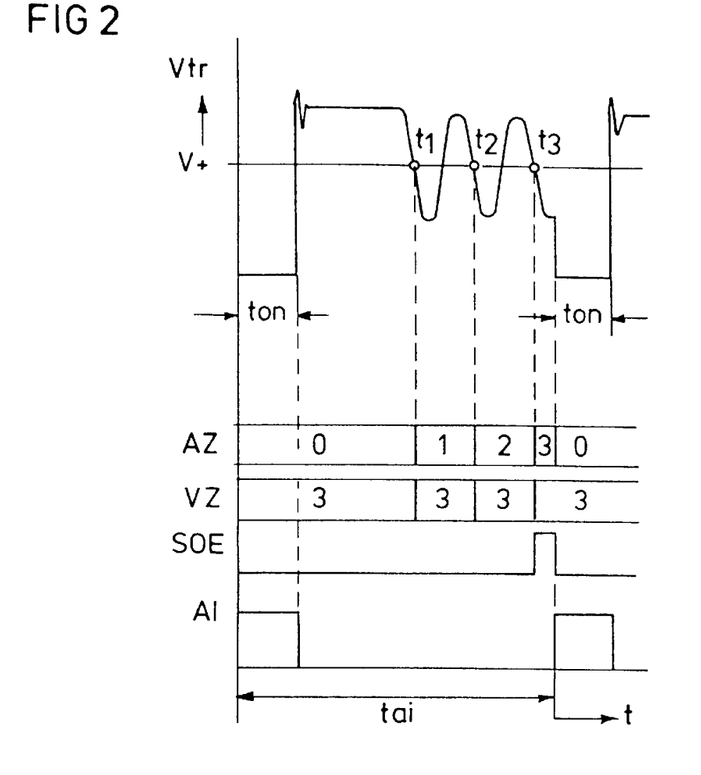
FIG. 2 is a graph showing timing profiles of a voltage across the switch, of a first counter reading, of a comparison counter reading, of an enable signal and of a drive signal with drive pulses.

In order to influence the switch-on frequency, in the method according to the invention, the voltage Vtr across the transistor T is evaluated. FIG. 2 shows a typical time profile of the voltage Vtr, the voltage Vtr being very small or approximately zero when the transistor T is in the on state, as is illustrated during the switch-on time durations ton. After the transistor T turns off, the voltage Vtr rises very rapidly to a value above the supply voltage V+ and remains at this value until the energy stored in the primary coil L1 is output to the secondary side. Afterward, the voltage Vtr decreases until it reaches the value of the supply voltage V+ at an instant t1. At this instant t1, the primary coil L1 is completely demagnetized for the first time after the opening of the switch T, so that the voltage across the primary coil L1 is zero. If the switch T is not immediately switched on again after the first demagnetization of the primary coil L1, then a so-called free transformer oscillation arises which is distinguished by a periodically alternating voltage across the transistor T or across the primary coil L1. The sum of the voltage across the primary coil L1 and the voltage Vtr across the transistor T corresponds to the supply voltage V+.

The voltage Vtr illustrated in FIG. 2 oscillates about the value of the supply voltage V+, the amplitude thereof decreasing with an increasing time duration on account of line resistances, but this is not illustrated in FIG. 2. Instants at which the voltage Vtr intersects the value of the supply voltage V+ are designated below as "zero crossings" of the voltage Vtr.

The method according to the invention provides for these zero crossings, after the transistor T has turned off, to be detected and counted. The n-conducting field-effect transistor T illustrated in FIG. 1 turns off when the drive pulses AI, as illustrated in FIG. 2, decrease from an upper drive level to a lower drive level. In FIG. 2, AZ designates a first counter value which contains the number of detected zero crossings after the transistor has turned off and which begins at zero after the transistor T has turned off. The method illustrated in FIG. 2 detects only zero crossings of the voltage Vtr upon the falling edge of the voltage Vtr. Consequently, the first counter value AZ assumes the counter value one at the instant t1 when the primary coil L1 is demagnetized for the first time. After a complete period of the oscillation of the voltage Vtr at the instant t2, the first counter value assumes the value two and, after a further period has elapsed at the instant t3, the counter value assumes the value three. The method according to the invention provides for the first counter value AZ to be compared with a comparison counter value VZ, which is set to 3 by way of example in the exemplary embodiment according to FIG. 2, and for the generation of a drive pulse AI to be permitted again only when the first counter value AZ has reached the comparison counter value VZ.

In the example in accordance with FIG. 2, in which the first counter value reaches the value of the comparison counter at the instant t3, the transistor is thus switched on again at the instant t3 at the earliest.

The voltage Vtr is also present across the storage capacitor C, which is discharged approximately completely when the transistor T turns on. In order to keep the switching losses as low as possible, the transistor T is switched on when the voltage across the capacitor C or across the transistor Vtr is as small as possible. Therefore, one embodiment of the invention provides, at the instant at which the operating counter value AZ reaches the value of the comparison counter VZ, for an enable signal SOE to be generated and for a drive pulse AI to be generated only with a falling edge of the enable signal SOE after the voltage Vtr across the transistor T or the storage capacitor C has decreased further.

The duration of the drive pulses AI is dependent on the amplitude of the control signal Vr, it holding true that the duration of the drive pulses AI is longer, the larger the control signal Vr. A large control signal indicates an excessively small output voltage, as a result of which, with lengthening drive pulses, the power taken up by the switched-mode power supply and output to the load increases in order to readjust the output voltage. The comparison counter value VZ, which concomitantly determines the number of omitted zero crossings and thus the period duration tai between two drive pulses AI, is likewise dependent on the control signal. The comparison counter value VZ is increased if the control signal Vr drops below a lower limit value Vrl, as will be explained. The control signal Vr dropping below the lower limit value Vrl indicates an excessively large output voltage or a load with a low power consumption. The comparison counter VZ is then increased in order, in the case of small output power, to reduce the switch-on frequency fai of the drive pulses AI, or to increase the time interval tai between two drive pulses. If the output voltage Va then decreases on account of a higher power consumption of the load and if, in the process, the control signal Vr rises above an upper limit value Vrh, as will be explained, then the comparison counter VZ is reduced again in order to increase the switch-on frequency fai again, or to reduce the time interval tai between two drive pulses again.

Figure 3A:
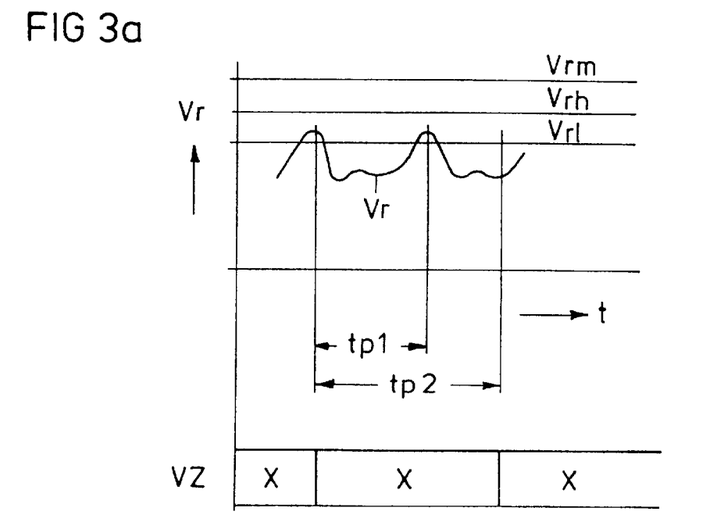
FIGS. 3a–3c are graphs showing timing profiles of a control signal and of a comparison counter reading, in order to illustrate an increase in or reduction of the comparison counter reading depending on the control signal and a lower and upper limit value.

The alteration of the comparison counter value VZ in a manner dependent on the control signal Vr and on the lower and upper limit values Vrl, Vrh is explained below with reference to FIGS. 3a–3c. FIG. 3a shows, by way of example, the profile of the control signal Vr against time, the control signal Vr fluctuating periodically in the time segment illustrated. Such a periodically fluctuating control signal Vr results from a load with a periodically fluctuating power consumption that brings about a periodically fluctuating output voltage Va, the output voltage Va being fed back via the control signal Vr.

FIG. 3a furthermore shows the comparison counter value VZ, which is generally represented as X. The control signal Vr is preferably evaluated during a time duration tp2, which is longer than a period duration tp1 of the fluctuations of the control signal Vr, or of the power fluctuations of the load RL connected to the output terminals AK1, AK2. The evaluation of the control signal Vr during a time interval tp2 which is longer than the period duration of the fluctuating control signal Vr ensures that the comparison counter value VZ is not altered on account merely of a momentary fluctuation in the control signal Vr. Thus, in one embodiment of the method according to the invention, provision is made for increasing the comparison counter value VZ by one only when the control signal Vr lies below the lower limit value Vrl during the entire time period tp2, that is to say when the output voltage Va has exceeded a predetermined limit value during the entire time duration tp2.

In the case of the time profile illustrated in FIG. 3a, although the control signal Vr occasionally lies below the lower limit value Vrl, it also occasionally exceeds the lower limit value Vrl within the time interval tp2, so that the comparison counter value VZ remains unchanged.

Figure 3B:
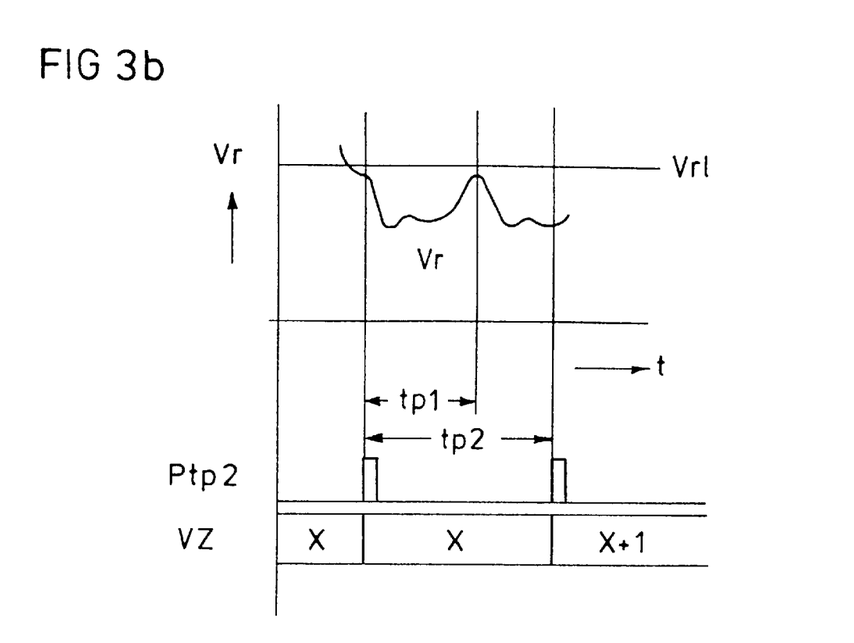

FIG. 3b shows a further exemplary time profile of the control signal Vr, in which the control signal Vr is initially still greater than the lower limit value Vrl, then drops below the lower limit value Vrl and remains below the lower limit value Vrl during an entire evaluation period tp2, so that the comparison counter value VZ is increased by one after the end of the evaluation period tp2, in order to reduce the switch-on frequency of the transistor T.

Figure 3C:
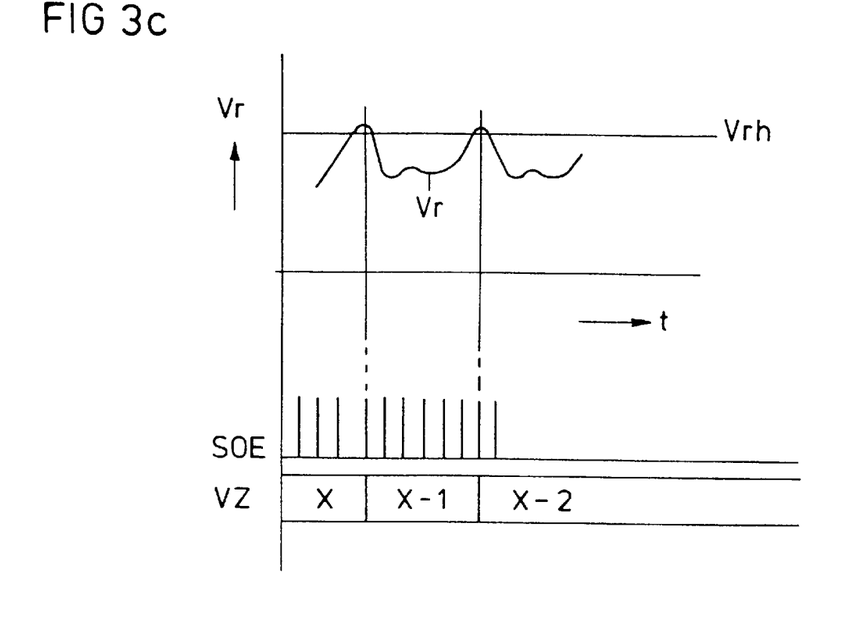

FIG. 3c shows a further exemplary profile of the control signal Vr, the control signal Vr at least occasionally being greater than an upper limit value Vrh, so that the comparison counter value VZ is reduced by one in order to increase the switch-on frequency of the transistor T. In the example in accordance with FIG. 3c, the comparison counter value VZ is reduced according to the enable signal SOE, that is to say the comparison counter value is reduced whenever the control signal Vr is greater than the upper limit value Vrh and when a pulse of the enable signal SOE is present, the pulses of the enable signal SOE being represented as very short pulses in FIG. 3c. The enable signal SOE thus serves as a clock signal for counting down the comparison counter value VZ.

The method of operation of a switched-mode power supply in which the described method is implemented is explained below with reference to FIGS. 1, 2 and 3. When the switched-mode power supply is switched on, the comparison counter value VZ is set to one and the output voltage Va is zero when the switched-mode power supply is switched on, which results in a very large control signal Vr, which is limited by a suitable circuit measure to a limit value Vrm, illustrated in FIG. 3a. As long as the control signal Vr is greater than the lower limit value Vrl, the comparison counter value VZ remains at one, i.e. the transistor T is always switched on again at the instant t1 if the primary coil L1 is in each case free of energy for the first time in a drive cycle. The duration of the drive pulses AI is dependent on the control signal Vr, the duration of the drive pulses AI being longer, the larger the control signal Vr. If the control signal Vr decreases, then the drive pulses AI are shortened and the time duration between the turn-off of the transistor T and the first zero crossing Vtr decreases, resulting in an increase in the switch-on frequency fai, or a reduction of the time interval between two drive pulses AI. In order to counteract a further increase in the switch-on frequency fai with a decreasing control signal Vr, i.e. a decreasing power output, the comparison counter VZ is counted up if the control signal Vr drops below the lower limit value Vrl. In one embodiment of the invention, the comparison counter VZ is counted up only when the control signal remains below the lower limit value Vrl during an evaluation period tp2. The consequence of increasing the comparison counter value VZ is that, after the next switch-on of the transistor T, a zero crossing of the voltage Vtr across the transistor T is omitted until the transistor T is switched on again. This results in a reduction of the switch-on frequency fai.

In the further course of events, the comparison counter value VZ is increased further if the control signal Vr remains below the lower limit value Vrl, in order to effect a further reduction in the switch-on frequency fai. Alternatively, the comparison counter value VZ is reduced if the control signal Vr rises to a value above the upper limit value Vrh, in order to increase the switch-on frequency fai again and to counteract a further decrease in the output voltage Va.

Figure 4:
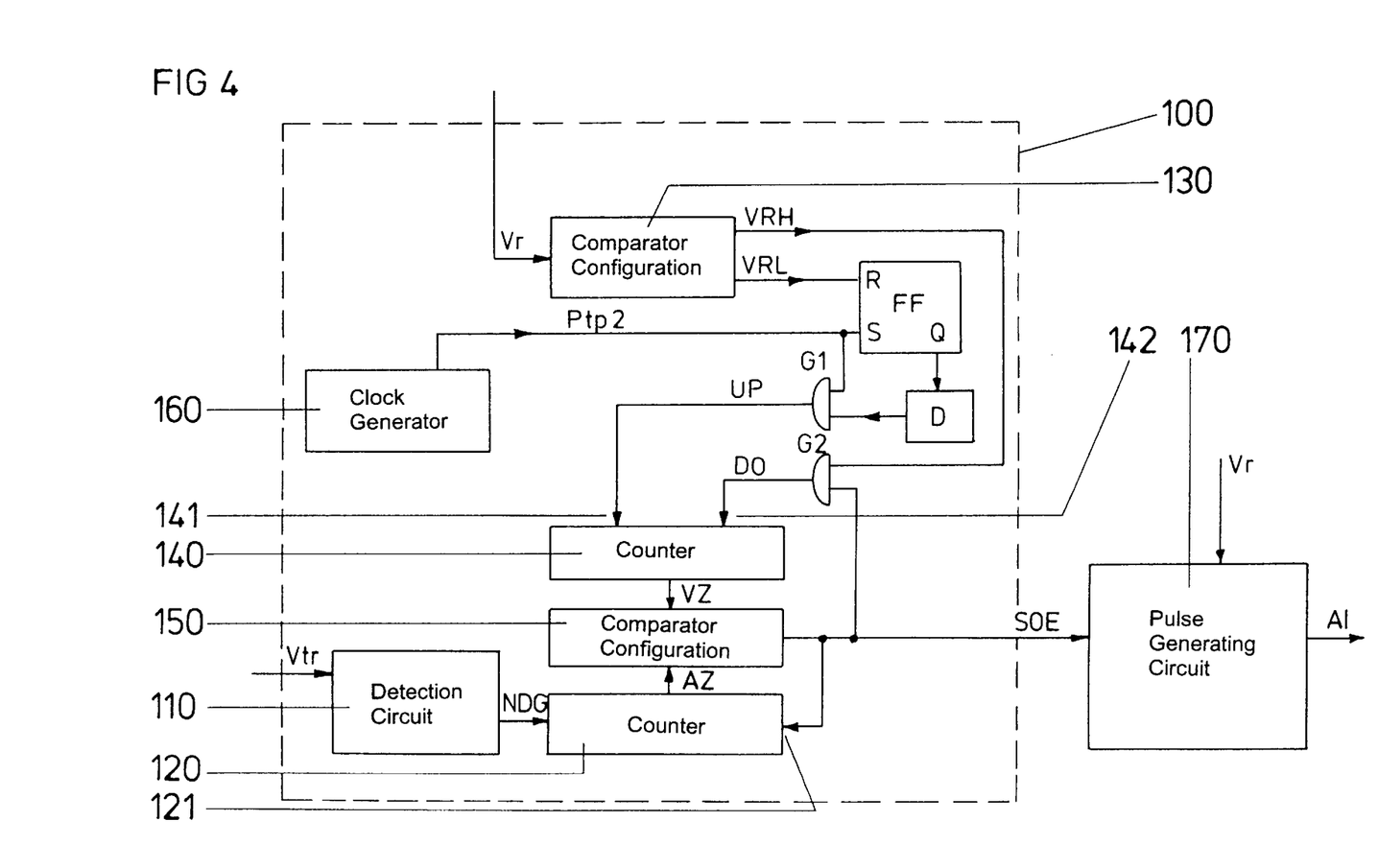
FIG. 4 is a block circuit diagram of a drive circuit according to the invention for providing a drive signal.

FIG. 4 shows a block diagram of the drive circuit 10 according to the invention for providing the drive pulses AI in accordance with the method according to the invention.

The drive circuit 10 has a circuit configuration 100 for providing the enable signal SOE and a pulse generating circuit 170 for generating the drive pulses AI in a manner dependent on the enable signal SOE and the control signal Vr.

The control signal Vr and the voltage Vtr across the transistor T are fed to the circuit configuration 100 for generation of the enable signal SOE. In this case, the voltage Vtr is present at a detection circuit 110, which provides a zero crossing signal NDG from the voltage Vtr, which signal is fed to a first counter configuration 120. An output counter value AZ is available at an output of the counter configuration 120 and is fed to a comparator configuration 150. A second counter configuration 140 provides the comparison counter value VZ, which is likewise fed to the first comparator configuration 150, the first comparator configuration 150 generating the enable signal SOE in a manner dependent on a comparison of the first counter value AZ with the comparison counter value VZ. The first and second counter configurations 120, 140 are preferably configured as digital counters, and the first comparator configuration 150 is preferably configured as a digital comparator configuration which in each case generates a pulse of the enable signal SOE if the first counter value AZ corresponds to the comparison counter value VZ. The counter reading of the first counter 120 is preferably reset with a falling edge of a pulse of the enable signal SOE in order, after the transistor T has been switched on again, to start the counting of the zero crossings of the voltage Vtr at zero again.

Figure 5:
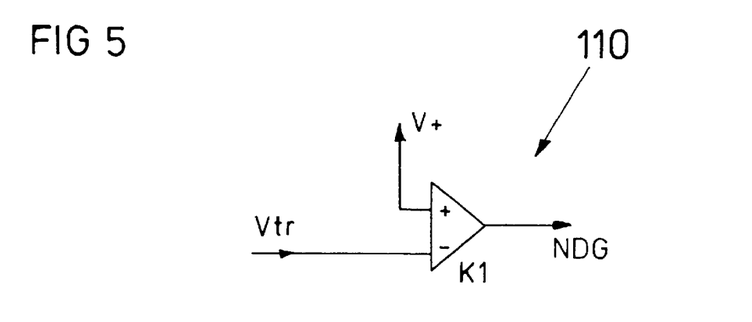
FIG. 5 is a circuit diagram of an exemplary embodiment of a circuit configuration for generating a zero crossing signal.

FIG. 5 shows an exemplary embodiment of the detection circuit 110 having a comparator K1, to whose non-inverting input the supply voltage V+ is fed and to whose inverting input the voltage Vtr is fed. The zero crossing signal NDG is available at the output of the comparator K1.

Figure 6:
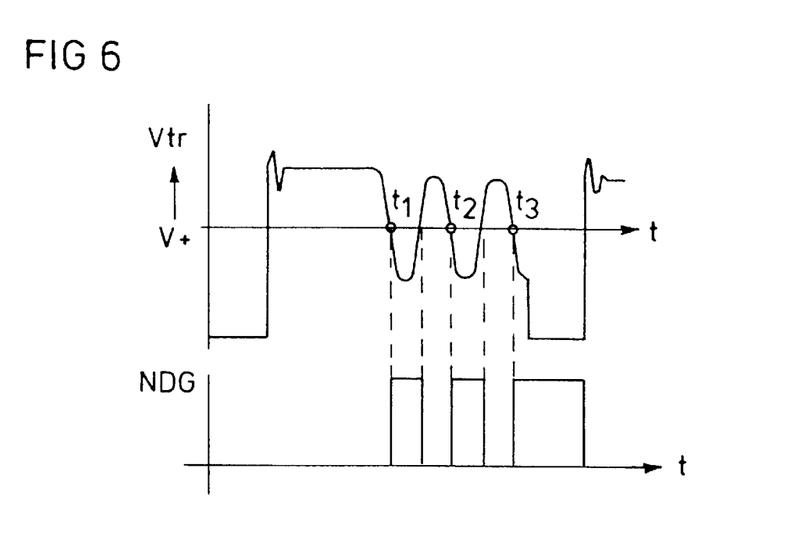
FIG. 6 is a timing profile of the zero crossing signal depending on the voltage across the switch.

FIG. 6 shows a time profile of the zero crossing signal NDG generated by the configuration in accordance with FIG. 5 and the associated time profile of the voltage Vtr. The zero crossing signal NDG assumes an upper level whenever the voltage Vtr drops below the value of the supply potential V+.

The first counter 120 is configured in such a way that the first counter value AZ is always increased by one with the presence of a rising edge of the zero crossing signal NDG. The first counter value is thus increased by one in each case at instants t1, t2, t3 at which the voltage Vtr across the switch T drops below the value of the supply voltage V+ in the event of a falling edge. Only the zero crossings in the event of a falling edge of the voltage Vtr are detected.

The comparison counter value VZ is counted up by the second counter configuration 140 in a manner dependent on a counting-up signal UP present at a first input 141, or is counted down in a manner dependent on a counting-down signal DO present at a second input 142.

The counting-up signal UP is dependent on a first comparison signal VRL, which is in turn dependent on a comparison of the control signal Vr with the lower limit value Vrl. Moreover, the counting-down signal DO is dependent on a second comparison signal VRH, which is in turn dependent on a comparison of the control signal Vr with the upper limit value Vrh.

Figure 7:
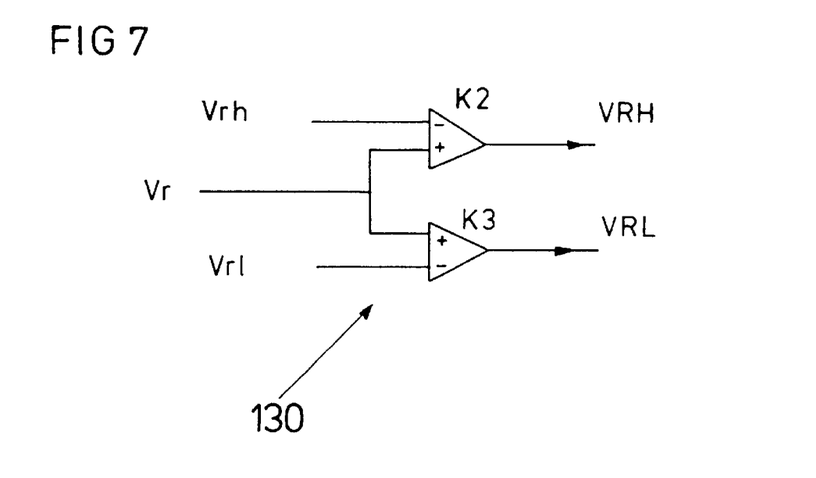
FIG. 7 is a circuit diagram of an exemplary embodiment of a second comparator configuration for providing the first and second comparison signals.

The first and second comparison signals VRL, VRH are provided by a second comparator configuration 130, to which the control signal Vr is fed. FIG. 7 shows an exemplary embodiment of the comparator configuration 130, having a first comparator K2 and a second comparator K3. The control signal Vr is fed to a non-inverting input of the first comparator K2 and the upper limit value Vrh is fed to an inverting input of the first comparator K2. The second comparison signal VRH available at the output of the second comparator K2 assumes an upper level if the control signal Vr is greater than the upper limit value Vrh. The control signal Vr is fed to a non-inverting input of the second comparator K3 and the lower limit value Vrl is fed to an inverting input of the second comparator K3, the first comparison signal VRL present at the output of the second comparator K3 assuming an upper drive level if the control signal Vr is greater than the lower limit value Vrl.

The second comparison signal VRH is fed to one input of an AND gate G2, to whose other input the enable signal SOE is fed and at whose output the counting-down signal DO is present. The comparison counter value VZ is counted down if the second comparison signal VRH assumes an upper drive level, that is to say if the control signal Vr is greater than the upper limit value Vrh, and if a pulse of the enable signal SOE is present. Consequently, the comparison counter value VZ is counted down in a manner dependent on a comparison of the control signal Vr with the upper limit value Vrh and in a manner clocked by the enable signal SOE.

A flip-flop FF is connected between the second comparator configuration 130 and the second counter 140, a clock generator 160 being connected to the set input S of the flip-flop, which clock generator, with the timing of the evaluation interval tp2 illustrated in FIG. 3a, generates pulses in order to set the flip-flop FF with the timing of the evaluation interval tp2. The first comparison signal VRL present at the output of the second comparator configuration 130 is fed to a reset input R of the flip-flop FF. If the control signal Vr exceeds the lower limit value Vrl and the first comparison signal VRL assumes an upper drive level, then the flip-flop FF is reset and a lower drive level is present at an output Q of the flip-flop FF.

If the control signal Vr remains below the lower limit value Vrl, then the flip-flop FF remains set, as a result of which an upper drive level is present at the output Q of the flip-flop FF and a counting-up pulse UP is generated for the second counter 140 with the next clock pulse of the clock signal Ptp2 through an AND gate G1, to which the clock signal Ptp2 and the output signal of the flip-flop are fed. In the exemplary embodiment in accordance with FIG. 4, the signal present at the output Q of the flip-flop is available at the AND gate G1 in a manner time-delayed by a delay element D. The delay element D is necessary since the pulse of the clock signal Ptp2 with which the counting-up pulse UP is generated also resets the flip-flop FF, so that the signal present at the output Q of the flip-flop FF already decreases with the presence of the pulse of the clock signal Ptp2.

The enable signal SOE of the circuit configuration 100 is fed to a pulse generating configuration 170, which generates drive pulses AI in a manner dependent on the enable signal SOE.

Figure 8:
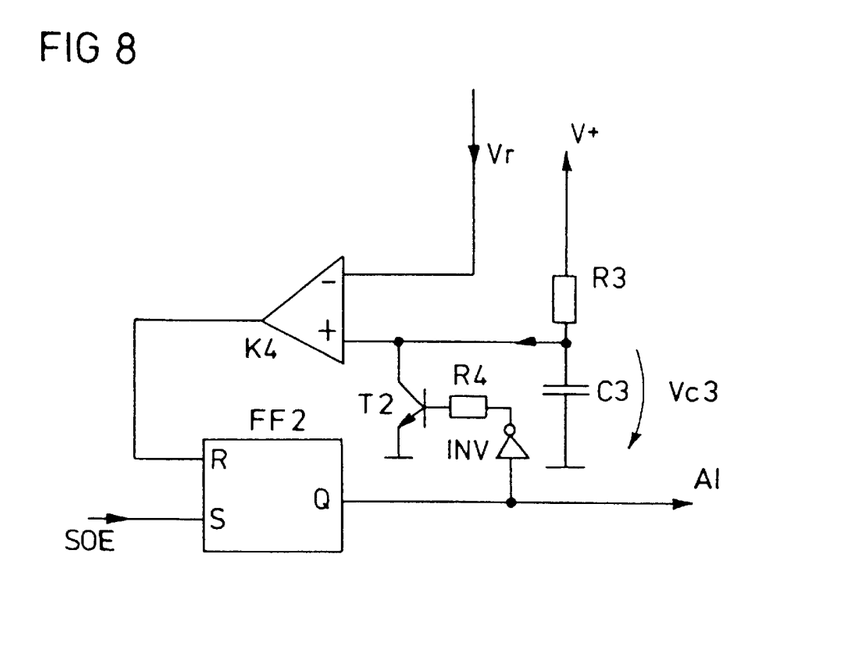
FIG. 8 is a circuit diagram of an exemplary embodiment of a pulse generating configuration for generating drive pulses in a manner dependent on an enable signal and a control signal.

FIG. 8 shows an exemplary embodiment of such a pulse generating configuration. The pulse generating configuration has an RS flip-flop FF2, to whose set input S the enable signal SOE is fed and at whose output Q the drive signal AI is available. As has already been explained above, the first comparator configuration 150 illustrated in FIG. 3 generates pulses of the enable signal SOE if the first counter value AZ corresponds to the comparison counter value VZ, as is illustrated in particular in FIG. 2. In accordance with the signal profile according to FIG. 2, the RS flip-flop FF2 is preferably configured in such a way that the flip-flop is set in each case with a falling edge of a pulse of the enable signal SOE, so that a drive pulse AI is generated with a falling edge of the enable signal SOE. The pulse generating configuration 170 has a comparator K4, to whose inverting input the control signal Vr is fed and between whose non-inverting input and reference-ground potential M a capacitor C3 is connected, which is connected to the supply potential V+ via a resistor R3. A bipolar transistor T2 is connected in parallel with the capacitor C3, the transistor being driven via an inverter INV and a resistor R4 in a manner dependent on the drive pulses AI, the bipolar transistor T2 turning on in order to discharge the capacitor C3 if the drive pulses AI have a lower drive level, that is to say if the transistor T of the switched-mode power supply turns off.

Figure 9:
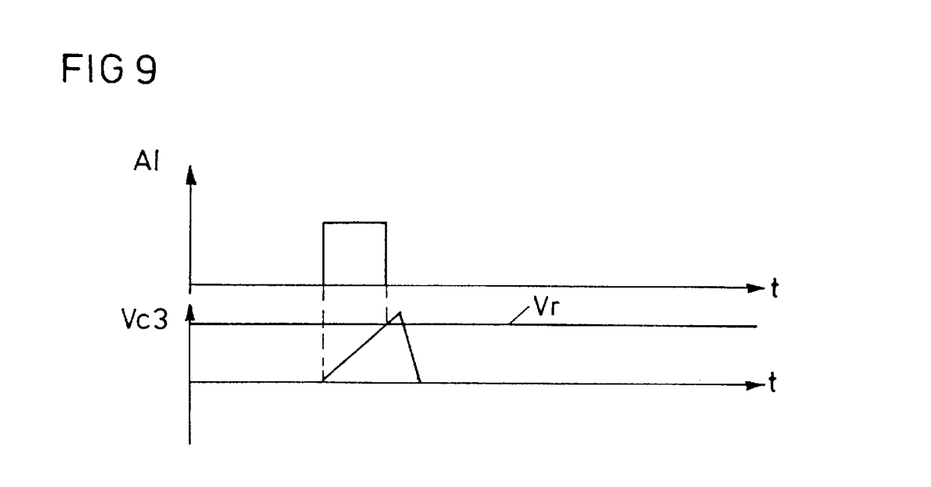
FIG. 9 is a timing profile of selected signals in the configuration shown in FIG. 8.

FIG. 9 illustrates the method of operation of the circuit configuration illustrated in FIG. 8 for generating drive pulses. With the setting of the flip-flop FF2, the output of the flip-flop FF2 assumes an upper drive level, thereby defining the beginning of the drive pulse AI. The bipolar transistor T2 turns off, and the capacitor C3 is charged via the resistor R3, as a result of which a voltage Vc3 present across the capacitor C3 rises. If the voltage Vc3 present across the capacitor C3 reaches the value of the control signal Vr, then the flip-flop FF2, whose reset input R is connected to an output of the comparator K4, is reset and the drive pulse AI ends. The transistor T2 is turned on again, and the capacitor C3 is discharged.

Consequently, the duration of the drive pulses AI is longer, the larger the control signal Vr.

Instead of the voltage Vtr across the transistor T, the method according to the invention can also use the voltage VL1 across the primary coil in order to detect the zero crossing instants. To that end, the voltage VL1 is compared with a second reference voltage value, which is not specifically illustrated. The voltage VL1 corresponds to the difference between the supply potential V+ and the voltage Vtr across the transistor.

I claim:

1. A method for driving a switched-mode power supply having a power switch connected in series with a primary coil of a transformer, the switched-mode power supply generating a control signal dependent on an output voltage of the switched-mode power supply, which comprises the step of:
   detecting reference instants, the reference instants being one of first reference instants at which a power switch voltage present across the power switch corresponds to a first reference voltage value and second reference instants at which a coil voltage present across the primary coil corresponds to a second reference voltage value;
   closing the power switch after a number of the reference instants detected has reached a comparison numerical value; and
   performing one of increasing and reducing the comparison numerical value in dependence on whether the control signal exceeds an upper limit value or falls below a lower limit value.

2. The method according to claim 1, which comprises reducing the comparison numerical value if the control signal exceeds the upper limit value.

3. The method according to claim 1, which comprises increasing the comparison numerical value if the control signal does not exceed the lower limit value within a predetermined time interval.

4. The method according to claim 3, which comprises setting the predetermined time interval to be longer than a period duration of a periodically fluctuating power consumption of a load connected to the switched-mode power supply.

5. The method according to claim 1, which comprises increasing or reducing the comparison numerical value by 1 in each case.

6. The method according to claim 1, which comprises detecting only the reference instants at which the power switch voltage present across the power switch drops below the first reference voltage value.

7. The method according to claim 1, which comprises determining the power switch voltage across the power switch directly by tapping off the power switch voltage at the power switch.

8. A switched-mode power supply, comprising:
   a transformer having a primary coil;
   a switch connected in series with said primary coil of said transformer and turns on and off according to drive pulses received by said switch;
   a drive circuit for generating the drive pulses in a manner dependent on an enable signal received by said drive circuit;
   a controller configuration outputting a control signal dependent on an output voltage and connected to said drive circuit; and
   a circuit configuration receiving the control signal and generating the enable signal, said circuit configuration, including:
      a detection circuit for detecting reference instants at which a voltage present across said switch corresponds to a predetermined first reference voltage value;
      a first counter connected to said detection circuit and having an output outputting a first counter signal;
      a second counter having a first input receiving a first signal dependent on a comparison of the control signal with a first reference signal, and a second input, receiving a second signal dependent on a comparison of the control signal with a second reference signal, said second counter having an output outputting a comparison counter signal; and
      a comparator configuration receiving the first counter signal and the comparison counter signal and outputs the enable signal, said comparator configuration connected to said drive circuit, to said first counter, and to said second counter.

9. The circuit configuration according to claim 8, wherein said circuit configuration has a further comparator configuration providing a first comparison signal, which is dependent on a comparison of the control signal with the first reference signal, and a second comparison signal, which is dependent on a comparison of the control signal with the second reference signal.

10. The circuit configuration according to claim 9, wherein said circuit configuration has a flip-flop connected between said further comparator configuration and said second counter, said flip-flop having a first input, a second input, and an output, said first input receiving a signal dependent on the first comparison signal and said second input receiving a clock signal, and the first signal fed to said first input of said second counter being dependent on an output signal of said flip-flop.

11. The circuit configuration according to claim 8, wherein said drive circuit receives the control signal and the enable signal, said drive circuit outputs the drive pulses in a manner dependent on the enable signal and the control signal.

12. The circuit configuration according to claim 10, wherein switch-on instants of the drive pulses are dependent on the enable signal and the drive pulses have a duration dependent on the control signal.

* * * * *